Patented Aug. 29, 1933

1,924,137

UNITED STATES PATENT OFFICE 1,924,137

PROCESS FOR MANUFACTURING ACID PHOSPHATE

William E. Stokes, Brooklyn, N. Y., and Charles T. Whittier, Nutley, N. J., assignors to Royal Baking Powder Company, New York, N. Y., a Corporation of New Jersey No Drawing. Application November 26, 1928
Serial No. 322,084

11 Claims. (Cl. 23—109)

The invention relates to acid phosphate, and particularly calcium acid phosphate, largely used as the acid ingredient, or part of the acid ingredient, to react with the bicarbonate of soda or alkali ingredient in baking powders and effervescent mixtures. The object of the invention is to provide for the production of an improved acid phosphate consisting of mono-calcium phosphate with not more than about 2 per cent of free phosphoric acid and a minimum of di-calcium phosphate. The materials used in the manufacture of acid phosphate, namely, phosphoric acid and calcium oxide or hydrate or other calcium salt, may yield a product containing varying quantities of free acid, di-calcium and mono-calcium phosphates; and the problem of the art has been to obtain from them a product comprising only the desired modicum of free acid and a minimum of di-calcium phosphate, at a cost rendering the process commercially practicable. The commercial product now largely used comprises approximately 6 per cent di-calcium phosphate and 100 parts thereof will decompose about 80 parts of bicarbonate of soda. The process of the present invention can be made to yield an acid phosphate with a reduced content of di-calcium phosphate, whereof 100 parts will decompose approximately 86 or more parts of bicarbonate of soda, at decreased cost, and in a shorter time.

The process commonly used for the manufacture of acid phosphate consists of mixing phosphoric acid with calcium oxide or hydrate or a calcium salt, such as di-calcium phosphate or calcium carbonate, stirring for some time, dumping the resulting mixture of mono-calcium phosphate, di-calcium phosphate, free phosphoric acid and moisture into bins, allowing the same to stand for from 24 hours to several days for further reaction, drying the material in vacuo for about 8 hours or at atmospheric pressure for a much longer time, grinding and bolting, the complete process requiring several days. Such a process yields a product having the content of di-calcium phosphate and the acid reacting value above mentioned and containing a considerable portion of particles so fine as to be undesirable for use in a baking powder or effervescent mixture.

According to the present invention, the formation of acid phosphate from phosphoric acid is effected in a way substantially to avoid the formation of di-calcium phosphate by employing concentrations and temperatures which have been found to have important effects upon the production and final product.

It is a commonly accepted fact that mono-calcium phosphate added to distilled water at ordinary temperatures will form a solution containing not more than five parts per hundred. The process of the present invention makes use of the discoveries that a much greater concentration of mono-calcium phosphate will remain as a clear solution in water in the presence of a certain amount of uncombined phosphoric acid, and that the concentration of mono-calcium phosphate which will remain as a clear solution in water with a suitable amount of uncombined phosphoric acid is governed partly by temperature. It has been further found that a greater concentration of mono-calcium phosphate in solution can be effected by adding the calcium compound to the acid than by adding the acid to the calcium compound, in such concentrations as have been found most useful in practicing the invention. Also by conducting the reaction in this manner, the full theoretical amount of reacting agent can be added to the acid in one continuous process, yielding a mixture of solution and suspension of mono-calcium phosphate, which mixture, if suitably dried, yields a satisfactory product.

In practicing the process, water may be introduced with the acid and/or with the calcium compound which is preferably finely divided calcium carbonate. It is convenient to add to the diluted acid the calcium compound suspended in water so that the final product has a concentration of mono-calcium phosphate, in solution or suspension, of 20 to 40 per cent. It has been found that a concentration of 30 to 40 per cent mono-calcium phosphate yields a desirable product. It will be understood that the relative proportions of the calcium compound and acid will be substantially those necessary to produce the desired degree of neutralization, as, for instance, where calcium carbonate is used substantially 50 parts of calcium carbonate to 98 parts phosphoric acid. The best results in this process are obtained by maintaining the temperature during the reaction at not more than 100° F., such control of temperature having an important effect upon the final product.

The resulting solution and suspension is best dried promptly. When, as is preferred, drying is effected by a spraying process, substantially as set forth in Letters Patent No 1,442,318 of January 16, 1923, the amount of heat to which the mixture is subjected may be automatically kept down, thus avoiding the formation of objectionable quantities of di-calcium phosphate and free acid. A suitable vacuum drying apparatus may be used instead of spraying. Whatever means of drying are used, to obtain proper results it is essential that no part of the material at any time reach a temperature exceeding 140° F. The excess temperature during the drying tends to increase di-calcium phosphate in the finished product.

We claim:—

1. A process for making acid phosphate comprising adding to diluted phosphoric acid finely divided calcium carbonate suspended in water to make a mixture having a concentration of 20 to 40 percent mono-calcium phosphate, maintaining the temperature during the reaction at not more than 100° F., and drying at a temperature not exceeding 140° F.

2. In a process for making acid phosphate, the improvement which comprises mixing phosphoric acid with a suitable calcium compound and water in quantities sufficient to effect the formation of acid phosphate of calcium and produce a concentration of 20 to 40 percent mono-calcium phosphate reacting at a temperature of not more than 100° F., and drying.

3. In a process for making acid phosphate, the improvement which comprises mixing phosphoric acid with a suitable calcium compound and water in quantities sufficient to effect the formation of acid phosphate of calcium and produce a concentration of 20 to 40 per cent mono-calcium phosphate, reacting at a temperature of not more than 100° F. and drying without permitting the material to reach a temperature exceeding 140° F.

4. In a process for making acid phosphate, the improvement which comprises adding to phosphoric acid a suitable calcium compound and water reacting at a temperature of not more than 100° F., and drying.

5. In a process for producing acid phosphate, the improvement which comprises mixing phosphoric acid with a suitable calcium compound in quantities sufficient to effect a formation of mono-calcium phosphate having a concentration of 20 to 40 percent, reacting at a temperature of not more than 100° F. and drying.

6. In a process for producing acid phosphate by reacting phosphoric acid with a calcium compound, the improvement which comprises effecting the reaction at a temperature of not more than 100° F. and drying an aqueous mixture containing 20 to 40 percent mono-calcium phosphate at a temperature of not more than 140° F.

7. In a process for producing acid phosphate by reacting phosphoric acid with a calcium compound, the improvement which comprises effecting the reaction at a temperature of not more than 100° F. and drying by spraying an aqueous mixture containing 20 to 40 percent mono-calcium phosphate at a temperature of not more than 140° F.

8. In a process for producing acid phosphate, an improvement which comprises mixing phosphoric acid with a suitable calcium compound and water in quantities sufficient to produce mono-calcium phosphate having a concentration of 30 to 40 percent, and reacting at a temperature of not more than 100° F.

9. A process for producing acid phosphate comprising adding finely divided calcium carbonate suspended in water to diluted phosphoric acid to form a mixture having a concentration of 30 to 40 percent mono-calcium phosphate maintaining a temperature during the reaction of not more than 100° F. and then drying at a temperature not exceeding 140° F.

10. A process for producing acid phosphate which comprises adding 50 parts of finely divided calcium carbonate to diluted phosphoric acid containing 98 parts of the acid to form a mixture having a concentration of 30 to 40 percent mono-calcium phosphate, maintaining a temperature during the reaction of not more than 100° F. and drying at a temperature not exceeding 140° F.

11. A process for producing acid phosphate which comprises adding to phosphoric acid a suitable calcium compound and water, reacting at a temperature of not more than 100° F. and drying at a temperautre not exceeding 140° F.

WILLIAM E. STOKES.
CHARLES T. WHITTIER.